Figures 1, 7:
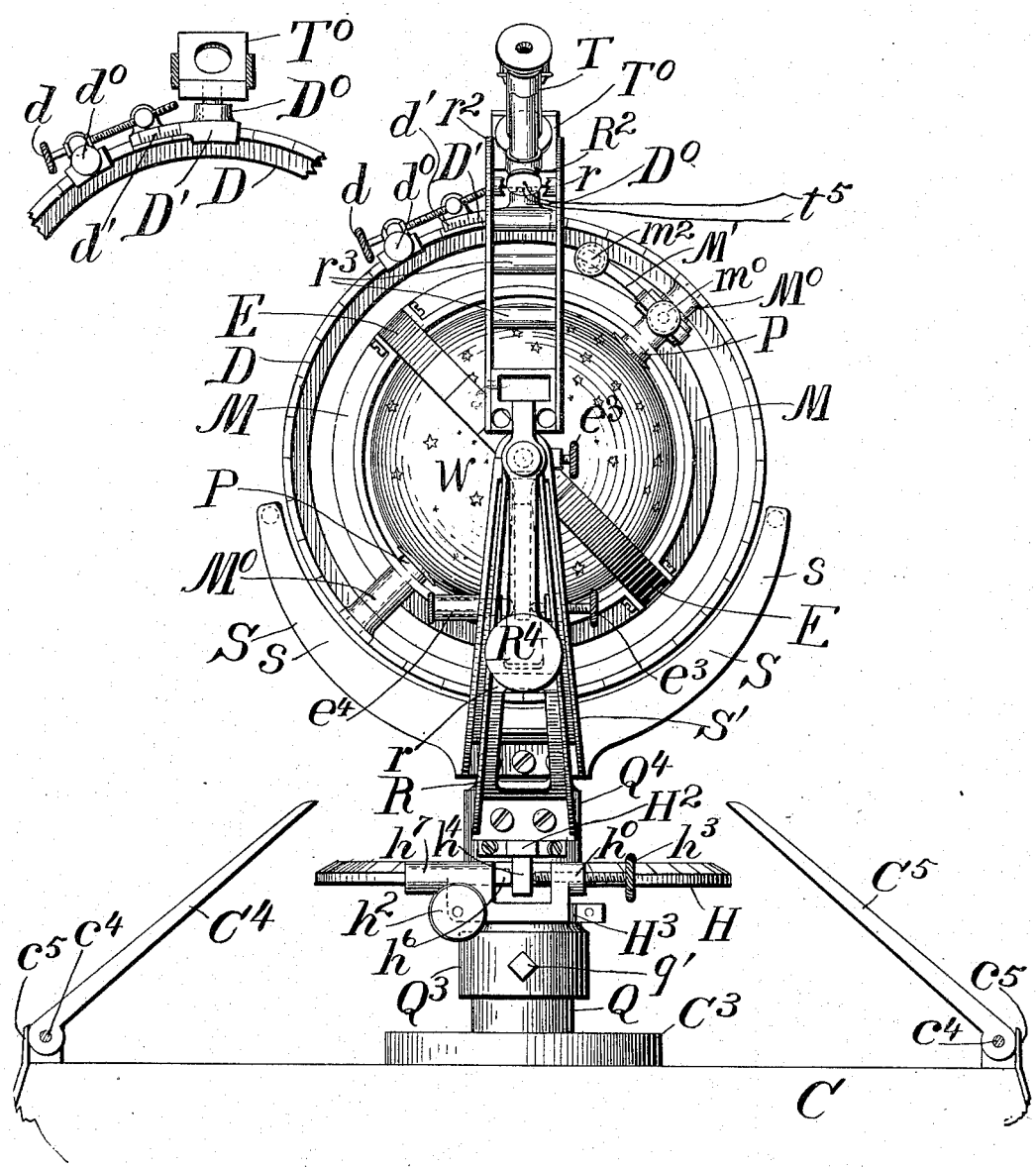

(No Model.) 4 Sheets—Sheet 1.

W. H. BEEHLER.
INSTRUMENT FOR TAKING ASTRONOMICAL OBSERVATIONS AT SEA.

No. 533,340. Patented Jan. 29, 1895.

Witnesses
Percy C. Bowen
J. C. Wilson

Inventor
William H. Beehler
By Whitman & Wilkinson
Attorneys

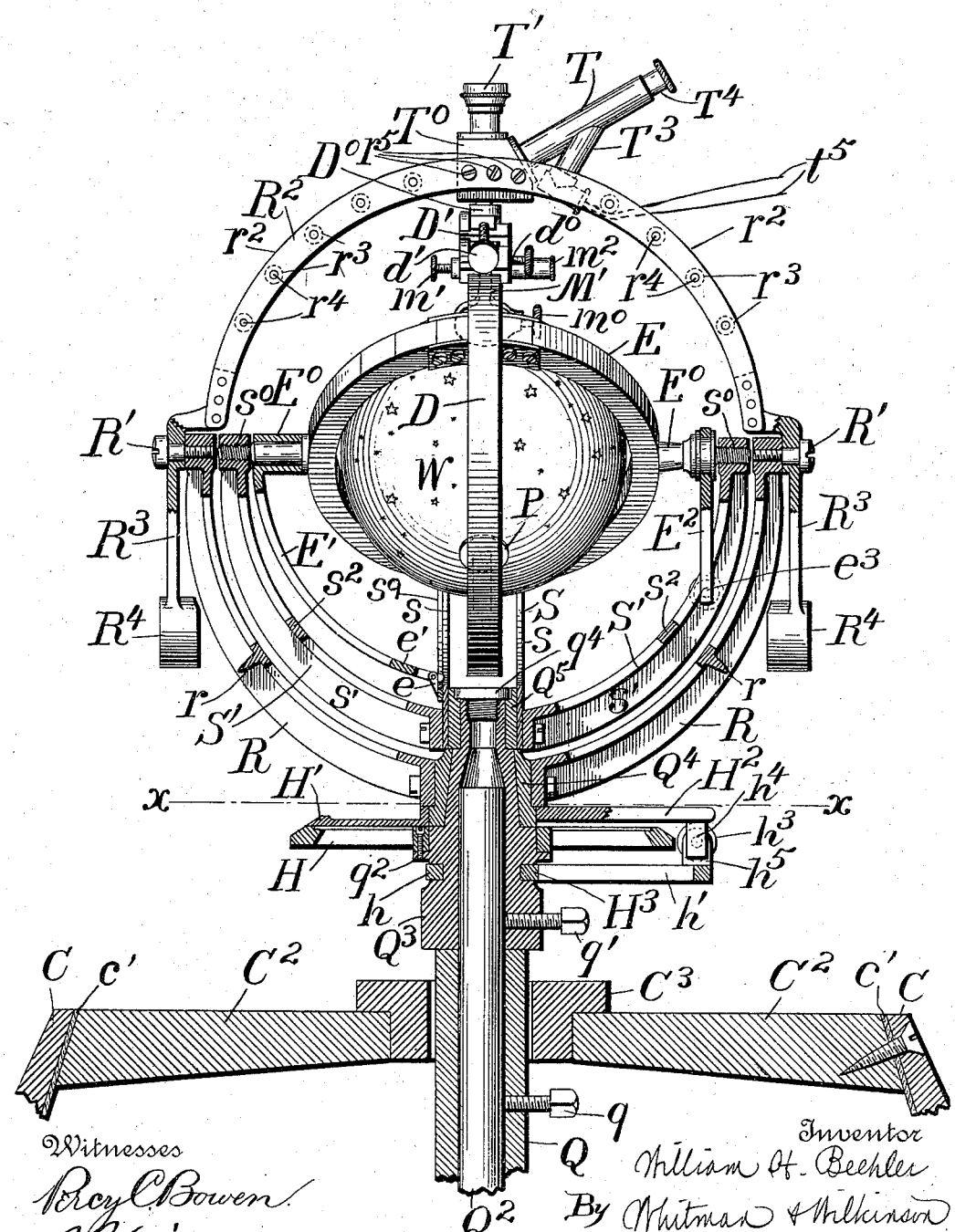

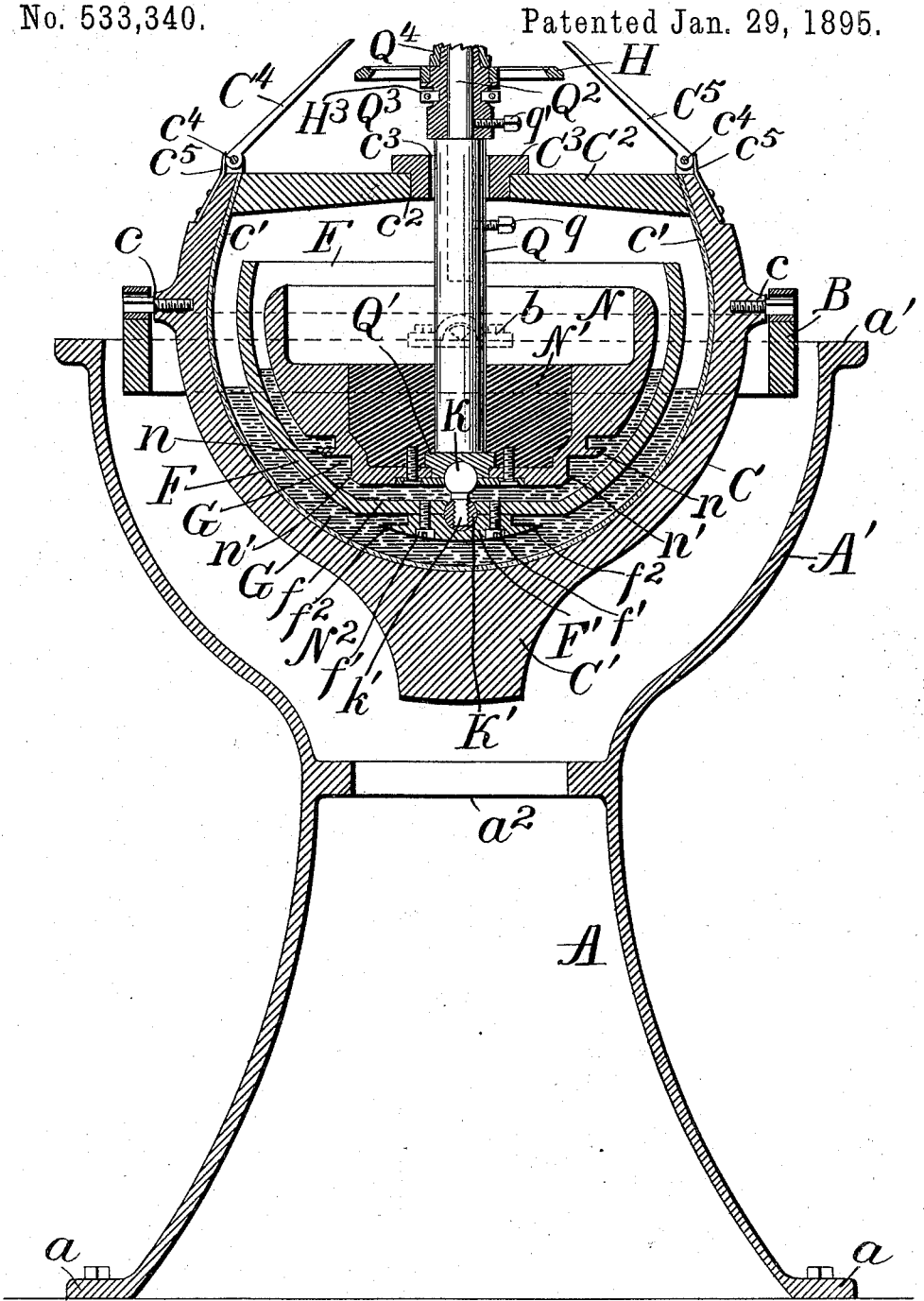

(No Model.) 4 Sheets—Sheet 4.
W. H. BEEHLER.
INSTRUMENT FOR TAKING ASTRONOMICAL OBSERVATIONS AT SEA.
No. 533,340. Patented Jan. 29, 1895.
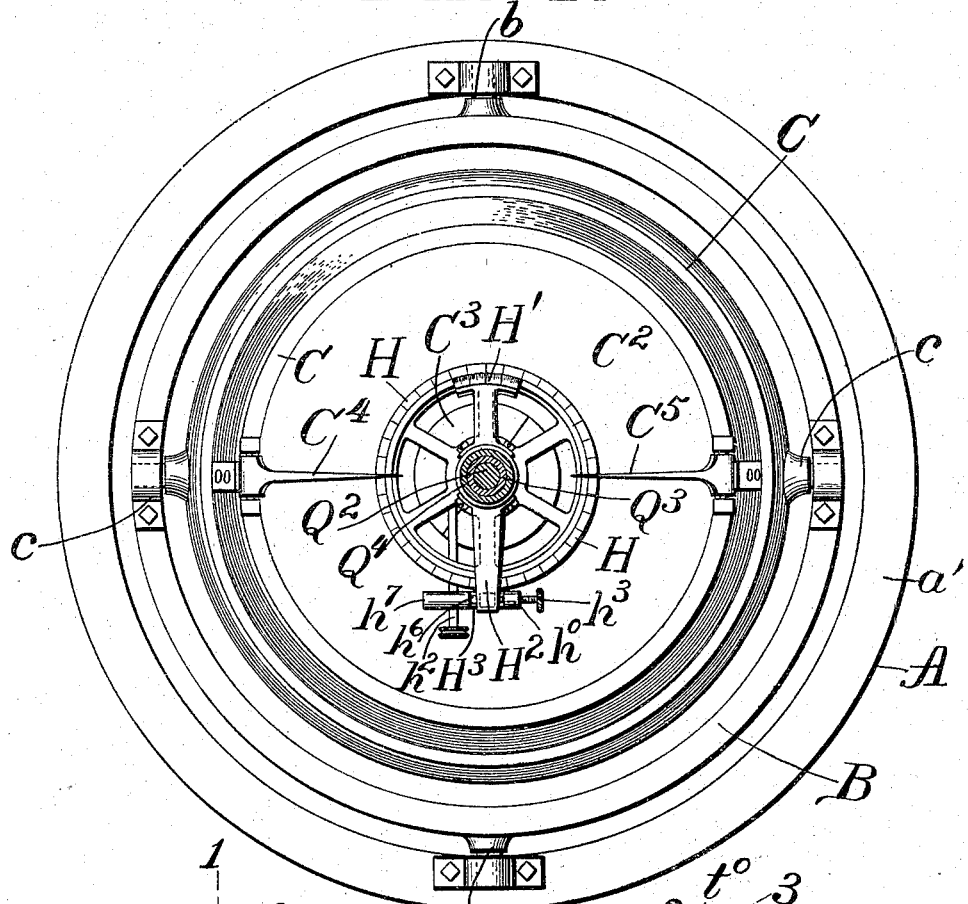
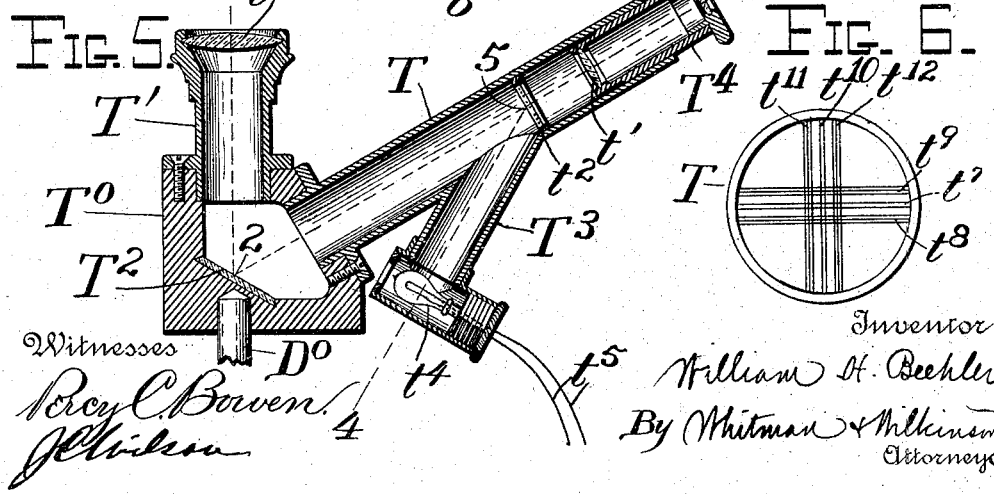

UNITED STATES PATENT OFFICE.

WILLIAM H. BEEHLER, OF THE UNITED STATES NAVY, ASSIGNOR TO THE BEEHLER SOLAROMETER COMPANY, OF BALTIMORE, MARYLAND.

INSTRUMENT FOR TAKING ASTRONOMICAL OBSERVATIONS AT SEA.

SPECIFICATION forming part of Letters Patent No. 533,340, dated January 29, 1895.

Application filed May 19, 1894. Serial No. 511,866. (No model.)

*To all whom it may concern:*

Be it known that I, WILLIAM H. BEEHLER, a citizen of the United States and a lieutenant in the United States Navy, residing at Washington, in the District of Columbia, have invented certain new and useful Improvements in Instruments for Taking Astronomical Observations at Sea; and I do hereby declare the following to be a full, clear, and exact description of the invention, such as will enable others skilled in the art to which it appertains to make and use the same.

My invention relates to improvements in instruments for taking observations of heavenly bodies and solving mechanically the parts of the astronomical triangle used in navigation, surveying, and other like work, and it is especially intended to facilitate the computation of such elements as are necessary to determine the position and compass error of a ship at sea independent of the visibility of the sea horizon.

My present invention is especially intended to provide for certain improvements upon and changes in the instrument known as a solarometer and described in the Letters Patent of the United States, granted to me December 1, 1891, and numbered 464,261.

Reference is had to the accompanying drawings, in which the same parts are indicated by the same letters throughout the several views.

Figure 1 represents a side elevation of the upper part of the instrument as mounted aboard ship, the plane of the cardboard indicating the fore and aft line of the ship. Fig. 2 represents a view of the upper portion of the instrument as seen from the left of Fig. 1, the lower part of the said Fig. 2 being shown in central vertical section. Fig. 3 represents a central vertical section of the lower part of the instrument and the pedestal on which it is mounted, the section being in the fore and aft plane of the ship. Fig. 4 represents a section along the line $x\,x$ of Fig. 2 and looking down. Fig. 5 represents a central vertical section through the axis of the telescope and of the object tube. Fig. 6 represents an enlarged view of the interior of the telescope tube showing the cross-hairs as they appear to the observer, and Fig. 7 represents a detail view of the attachments by which the telescope box is held on and allowed to move along the declination circle.

A represents the pedestal which may be of any desired pattern, and is bolted to the deck by means of bolts through the flanges $a$. The upper portion of this pedestal is made bowl-shaped as at A' and provided with an upper flange or stiffening rib $a'$, on which the various parts of the instrument are supported. The bottom of this bowl-shaped portion A' is preferably provided with an aperture $a^2$ to allow the escape of any water or other liquid or solid particles that might fall into the top of the pedestal. A ring B is suspended on gimbals $b$ on the top of this pedestal, and at right angles to these gimbals $b$ are the gimbals $c$ by means of which the bowl C is suspended in the ring B. This bowl C is provided with a heavy downward projection C' whose weight lowers the center of gravity of the apparatus and assists in keeping the said bowl steady on its gimbals regardless of the motion of the ship. This bowl C is preferably lined with porcelain $c'$ so as to lessen the friction of the mercury on the inner surface of the said bowl. This porcelain lining would enable metals that amalgamate with mercury to be used in the manufacture of the bowl C, though I preferably use cast iron for this purpose. The bowl C has a cover $C^2$. The inner gland $C^3$ is perforated as at $c^3$ to allow the column Q plenty of lateral play but this gland may be removed if desired.

At the upper edges of the bowl C and one hundred and eighty degrees apart, two pointers $C^4$ and $C^5$ are provided which are pivoted at $c^4$ and are held in any desired position by the springs $c^5$. These pointers may be arranged in any known position relative to the ship, but to avoid index corrections, are preferably arranged in the bow and stern line of the ship, and are adapted to swing down over the azimuth circle H, and to indicate the bearing that the bow and stern line of the ship makes with the true bearing of the sun or other body observed, which bearing compared with the compass bearing of the ship's head as indicated by the lubber point in the ship's compass, will give the compass error as will be more fully hereinafter described.

The outer bowl C, is partly filled with mercury G, in which mercury an inner bowl F is floated. This inner bowl is perforated at its bottom to receive the lower ball K' of a ball and socket joint, whose upper ball K is secured to the lower ball by means of the screw-threaded tongue k'. Over the base of this ball K', and securing the same revolubly in position, a cap F' is attached by bolts f' to the base f of the bowl F. This cap is provided with an annular groove above the sharp edges $f^2$, and the function of these edges and of this groove are to catch in the mercury, and to lessen vibrations of the bowl F, or to accomplish the same result as a bilge keel in a ship. Floating in this bowl F is a float N, which is buoyed up in the mercury G in the said bowl F, and is prevented from moving too far to either side of the bowl F by means of the ball and socket joint already referred to. This float is similar in interior contour to the interior contour of the bowl F, except that it is provided with annular grooves above the sharp edges n and n', which edges serve to lessen the vibrations of the float in the mercury, as has been already described with reference to the edges $f^2$ on the outer base of the bowl F. In the interior of this bowl N and low down therein a mass of lead N' is provided, the purpose of this mass of lead being to lower the center of gravity, and produce stable flotation in the mercury.

Enough mercury is put into the bowl F to float the float N, with the weight of the instrument and connected parts mounted thereon, and at the same time not to immerse the float so much as to cause excessive friction on the ball K which is revolubly connected to the base of the float. It will thus be seen that the float is perfectly free to move through small distances laterally in the bowl F, or to revolve freely about its vertical axis.

All the various surfaces of the float and the bowls in contact with the mercury may be lined or coated with porcelain, shellac, or varnish to lessen friction. Rigidly secured in the vertical axis of this float is the column Q, connected by means of the shoe piece Q' to the bottom of the float, and passing up through the lead which is preferably poured around it in the melted condition, and thus assist to hold the same firmly in position. The weights in, or attached to, this float N should be so adjusted that the axis of the said column Q is at all times carried absolutely vertical, and normal to the plane of the mercury in the inner bowl F. This column Q is made hollow in its upper portion to receive the rod $Q^2$ (Fig. 2) which is clamped to the said column by means of the set screw q. Above this column Q a sleeve $Q^3$ is secured fast to the rod $Q^2$ by means of the set screw q', and on this sleeve the horizontal circle or azimuth circle H is rigidly attached, (as by the set screw $q^2$,) and the various other parts of the instrument above the azimuth circle are revolubly mounted.

$Q^4$ represents an outer sleeve revolubly mounted on the sleeve $Q^3$, and carrying the vertical frame R which consists of two quadrantal brackets connected together by ribs r, and terminating in bosses to receive the screws R' on which the semicircular telescope carrier bracket $R^2$ is pivotally mounted. This bracket $R^2$ is made of two side plates $r^2$ secured together with bolts $r^4$ and stay-thimbles $r^3$.

The movement of the telescope carrier frame $R^2$ is balanced by counterpoise weights $R^4$ which are connected by means of the dependent arm $R^3$ to the telescope circle $R^2$, and these weights are adjusted so that the center of gravity of the telescope and its various connections, will at all times lie in the vertical axis of the instrument. These weights may be either fixed, as shown, or adjustably mounted, on the arms $R^3$.

Just above the sleeve $Q^4$, and revolubly mounted on the sleeve $Q^3$, another sleeve $Q^5$ is provided. To this sleeve $Q^5$ the brackets S and S' are rigidly attached. These brackets are constructed of two side pieces s and s' connected together by ribs $s^2$. The brackets S are shorter than the brackets s' being in the form of an arc of a circle, and extending sixty-five degrees on either side of the vertical axis of the instrument. This bracket indicates the latitude of the observer, and since this would rarely be greater than sixty-five degrees the range of the latitude circle or polar bracket is preferably limited to sixty-five degrees. At right angles with this latitude circle S, the brackets S'' are provided in the upper ends of which are carried journal bearings $s^0$ for the journals $E^0$ of the equatorial circle E. This equatorial circle is made in the form of a segment of a sphere, concentric with the stellar globe W. The exterior surface of this equatorial circle is graduated to twenty-four hours and each hour into one hundred and sixty minutes. A vernier moving over these gradations points the circle to be read to one second of time. Fixed at right angles to this equatorial circle E is a meridian circle M, which carries, at ninety degrees from the central plane of the shaft bearings of the equatorial circle, a polar axis, which axis revolubly supports the concentric stellar sphere, and the concentric declination circle D graduated to degrees, minutes, &c.

It will be noted that the circles E, M, D and S are concentric with each other and also with the stellar sphere, while the center of the circle H is in the same vertical line with the common center of the other circles. The telescope is moved along this declination circle D, the telescope carrier bracket $R^2$ swinging out of the perpendicular, and the only limitation upon its travel being the horizontal plane of equatorial shaft bearings.

The horizon or azimuth circle H being fixed at right angles to the vertical axis of the instrument, is practically an artificial horizon and the angle shown by the vernier H' which is in the same vertical plane as the axis of the telescope and indicates the azimuth of the body observed relative to the zero point of the circle H. This vernier H' operates in conjunction with an opposite arm H², both fast to the sleeve Q⁴, the said arm having a downwardly projecting lug h⁴.

A lower arm h' encircles the sleeve Q³ as at H³ and is normally free to revolve thereon, except when held by the clamp screw h². The fine motion is given to the vernier H' by means of the tangent screw h³, which bears against one face of the lug h⁴, the other face of the lug being borne against by the spring plunger h⁶, projecting from the cylinder h⁷ in which a coil spring, not shown, is mounted. It will thus be seen that there is no lost motion between the screw h³ and the lug h⁴. This form of clamp, however, is not new, and is not claimed as a part of my invention.

The circle H is graduated to one hundred and eighty degrees on either side from the zero point. The plane of the zero and one hundred and eighty degrees points is fixed to lie in the same vertical plane as that of the meridian circle, and when the axis of the circle is exactly parallel with the ship's keel, the sum of the angles indicated by the pointers C⁴ and C⁵ would be exactly one hundred and eighty degrees. Should, however, the float N be a little out of the center of the bowl F, as would generally be the case, the sum of the angles indicated by the two pointers C⁴ and C⁵ would be somewhat less than one hundred and eighty degrees, and the index correction for determining the bearing of the ship's head would be one-half of the difference between the sum of the observed angles and one hundred and eighty degrees.

Rigidly connected to one of its bearings E⁰ of the equatorial circle E there is an arm E' which carries a vernier e which travels along a graduated circle s⁹ attached to or integral with one of the sides s of the latitude circle or polar bracket S.

Adjustment for latitude, is given to the pole of the meridian circle M which is fast to the equatorial circle E, by means of the clamp screw e³ which clamps the arm E² on the opposite journal of the equatorial circle, which arm is given fine motion by the tangent screw e³ which bears on one side of the arm E², while the spring plunger e⁴ bears on the other side of the said arm. It will thus be seen that the pole of the meridian circle may be set at any desired elevation by means of the said clamp and the vernier on the circle S will, therefore, show the latitude.

The hour angle of the astronomical body is indicated by the angle that the declination circle D makes with the meridian circle M. This declination circle is revolubly connected by the bearings M⁰ on the polar axis at points one hundred and eighty degrees apart on the meridian circle M, and the angle between the two circles M and D is read by a vernier similar to those already described traveling along the top of the equatorial circle E, and connected to the declination circle D.

Fine motion is given to the declination circle by means of the clamp screw $m^0$, and the tangent screw $m^2$ connected to the arm M' and operating similar to the vernier attachments already described. By placing these various vernier attachments in connection with journals of the various circles, the graduated edges of these circles are left free for reading the instrument, and also for the motion of the various parts traveling along or in proximity to these outer surfaces.

The telescope carrier bracket R² has rigidly attached thereto in a plane passing through the vertical axis of the instrument a block T⁰ in which is mounted a mirror T². This mirror T² is so set with relation to the axes of the tubes T' and T, that a ray of light coming in the axis of the tube T' will be reflected by the mirror T² in the axis of collimation of the telescope T, as indicated by the lines 1—2 and 2—3 of Fig. 5.

The tube T' may be provided with a lens $t^3$, while the telescope is provided with the usual eye-piece T⁴ having lenses at $t^0$ and $t'$, and also with a plurality of cross-hairs at the focus of the telescope $t^2$. These cross-hairs are illuminated by a small electric light $t^4$ having wire $t^5$ leading to a battery. The electric light is placed at the base of the tube T³ connected to the telescope C as shown in Fig. 5.

The battery should preferably be placed in the hollow portion of the base of the pedestal, but this is immaterial. The cross-hairs are preferably arranged as shown in Fig. 6, that is with two central pairs of cross-hairs $t^7$ and $t^{10}$ crossing each other at a very small distance from the axis of the telescope, and forming a small square inclosing this axis in its center thereof. This small square should preferably be about one square millimeter in area. Outside of these two pairs of central cross-hairs are four groups of cross-hairs of three each, indicated by $t^8$, $t^9$, $t^{11}$, and $t^{12}$. These groups of cross-hairs form three separate squares surrounding the axis of collimation of the telescope. The cross-hairs are so arranged in the instrument that the smallest of these three squares should be the inscribed square of the sun's disk at its smallest apparent diameter. The outer square should be the circumscribed square of the sun's disk at its greatest apparent diameter, while the intermediate square should be the inscribed square of the sun's disk at its greatest apparent diameter.

The cross-hairs in the telescope are so arranged that half of them are always carried in the exact horizontal plane while the others perpendicular to them, are always in the vertical plane. The altitude of a heavenly body observed is determined by the horizontal cross-hairs and its azimuth by the vertical cross-hairs. If the observed body is not in the exact axis of the telescope its distance from the axis will be measured by the distance from the horizontal and vertical cross-hairs and hence by changing the elevation of the pole or the azimuth, respectively, the body observed will be brought exactly in the plane of the axis of the telescope.

When observing the sun a cap with a stained glass flat lens should be used to go over the eye-piece T⁴.

The block T⁰ carrying the mirror and telescope is pivotally connected by means of the lug D⁰ to the block D' which has an overhanging lip adapted to engage beneath the flange on the declination circle D, and at the same time to allow free movement along said circle. Fine movement is given by means of the clamp screw d⁰, and the tangent screw d, which latter operates the vernier d' attached to the block D', which moves with the block T⁰.

W represents a hollow sphere on which most of the conspicuous stars are indicated in their proper right ascension and declination, for the purpose of assisting the observer in recognizing the star to be observed.

The method of taking observations with the instrument is as follows:

First. Find from the *Nautical Almanac* the sun's declination for the Greenwich apparent time.

Second. Set the salarometer's declination arc to the sun's declination and the latitude arc to observer's approximate latitude.

Third. Turn the solarometer in azimuth to the sun bringing the axis of the telescope to the sun's altitude by changing in azimuth and elevation of the pole as necessary. Observe when the center of the sun's disk is exactly in the axis of the telescope and mark that second of time by the watch. At the same instant, preferably with an assistant, read the two opposite sides of the horizon circle under the two pointers, which indicate the fore-and-aft line of the ship. Subtract the sum of these readings from one hundred and eighty degrees and add the half difference to the reading of the forward pointer to find the ship's true course. The difference between this true course and the compass course at the instant of the observation will be the compass error.

Fourth. Record the solarometer readings of declination (latitude) hour-angle, and azimuth and compute the azimuth that corresponds to the first three quantities from the azimuth tables.

Fifth. When the latitude, hour-angle and azimuth are all unknown it may be possible to have the axis of the telescope at the sun's true altitude and these three quantities may all be in error. By the construction of the instrument the telescope must move in the plane of the path of the sun in the sky from rising to setting, if the latitude is correct and allowance be made for changes in the sun's declination. Proceed to take a second or a series of observations and it will be evident from the results whether the movement of the telescope is in the plane of the sun's path. If these results agree the telescope moved in that plane; if not, it moved in a plane parallel but either too high or too low. The latitude must then be changed according to the discrepancy, and by a series of observations the exact path of the sun will be followed by the axis of the telescope. The final result is then certain to be correct. With a series of observations it is important to allow for changes in the declination and observer's latitude, if the time interval is considerable. If either the latitude hour-angle or azimuth is known, one observation will determine the others.

Sixth. For observations of a star or a planet, find from the almanac the star's right ascension and declination and the right ascension of the mean sun for the Greenwich mean time. Observe as in the sun, finding the local mean time from the star's right ascension and the right ascension of the mean sun applied to the star's hour-angle read from the solarometer. Record results and proceed as with the sun.

Seventh. For observations of the moon proceed as with a star, carefully noting the rapid change in the moon's declination; but it is not recommended to take observations of the moon because of its rapid change in declination and its horizontal parallax.

Eighth. By the mechanical support of the equatorial circle at the points six hours from the meridian, the declination circle cannot revolve beyond those points; and the shaft bearings at those points prevent observations when the hour-angle is between five and one-half and six and one-half hours from the local meridian. To observe a body which is more than six and one-half hours from the local meridian, the telescope must be set to the subpolar declination and the hour-angle when (for example) east of the local meridian must be read from the hour-circle on the west side and subtracted from twelve hours to give the body's true hour-angle.

Ninth. For the practical use of this instrument aboard ship it is essential that it be provided with a suitable cover to protect the instrument from the wind, the weather, and the sea without any interposition of any refracting material between the object glass and the heavenly body observed. The cover designed for this purpose is arranged to permit an opening of any desired size to admit of a view of the heavens from the horizon up to about thirty degrees beyond the zenith, and by revolving the said cover this opening may be given any desired bearing.

The various parts of the instrument supported on the column Q should be as light as possible compared to the weight of the float, and for this purpose they should be made of aluminum, channel ribbed metal, or other light material.

Should it be desired one or more additional bowls similar to the bowl F and contained therein may be added.

It is also purposed to use the solarometer for surveying on shore in which case any level support permanent or temporary may be adopted in place of the float, and mounted on said support beneath the circles would be provided a theodolite. The azimuth circle would then serve as the horizon circle of a theodolite with the telescope carried in a suitable frame beneath the same.

Moreover it will be evident that various other modifications of the herein described apparatus, might be made which could be used without departing from the spirit of my invention.

Having thus described my invention, what I claim, and desire to secure by Letters Patent of the United States, is—

1. In an apparatus of the character described, the combination with an outer bowl suspended from gimbals and partly filled with a heavy liquid, of an inner bowl floating in said liquid and itself partly filled with a heavy liquid, a float floating in the liquid in said inner bowl, a vertical column carried by said float, and apparatus for taking observations carried by said column, substantially as and for the purposes described.

2. In an apparatus of the character described, the combination with an outer bowl suspended from gimbals and partly filled with a heavy liquid, of an inner bowl floating in said liquid and itself partly filled with a heavy liquid, a float floating in the liquid in said inner bowl, a vertical column carried by said float, pointers mounted in said outer bowl and a horizontal azimuth circle carried by said column, substantially as and for the purposes described.

3. In an apparatus of the character described, the combination with an outer bowl suspended from gimbals and partly filled with a heavy liquid, of an inner bowl floating in said liquid and itself partly filled with a heavy liquid, a float floating in the liquid in said inner bowl, a vertical column carried by said float, pivoted pointers mounted on said outer bowl one hundred and eighty degrees apart, springs for holding said pointers in any desired position, and a horizontal azimuth circle carried by said column between said pointers, substantially as and for the purposes described.

4. In an apparatus of the character described, the combination with an outer bowl suspended from gimbals and partly filled with a heavy liquid, of an inner bowl floating in said liquid and itself partly filled with a heavy liquid, a float floating in the liquid in said inner bowl, a ball and socket joint connecting said float and said inner bowl, a vertical column carried by said float, and apparatus for taking observations carried by said column, substantially as and for the purposes described.

5. In an apparatus of the character described, the combination with an outer bowl suspended from gimbals and partly filled with a heavy liquid, of an inner bowl floating in said liquid and itself partly filled with a heavy liquid, a float floating in the liquid in said inner bowl, and a ball and socket joint connecting said float and said inner bowl, a vertical column carried by said float, pointers mounted in said outer bowl and a horizontal azimuth circle carried by said column, substantially as and for the purposes described.

6. In an apparatus of the character described, the combination with an outer bowl suspended from gimbals and partly filled with a heavy liquid, of an inner bowl floating in said liquid and itself partly filled with a heavy liquid, a float floating in the liquid in said inner bowl, a ball and socket joint connecting said float and said inner bowl, a vertical column carried by said float, pivoted pointers mounted on said outer bowl one hundred and eighty degrees apart, springs for holding said pointers in any desired position, and a horizontal azimuth circle carried by said column between said pointers, substantially as and for the purposes described.

7. In an apparatus of the character described, the combination with an outer bowl suspended from gimbals and partly filled with a heavy liquid, of an inner bowl floating in said liquid with ribs projecting into said liquid and being itself partly filled with a heavy liquid, a float floating in the liquid in said inner bowl, and provided with ribs projecting into said liquid, a vertical column carried by said float, and apparatus for taking observations carried by said column, substantially as and for the purposes described.

8. In an apparatus of the character described, the combination with an outer bowl suspended from gimbals and partly filled with a heavy liquid, of an inner bowl floating in said liquid with ribs projecting into said liquid and being itself partly filled with a heavy liquid, a float floating in the liquid in said inner bowl, and provided with ribs projecting into said liquid, a vertical column carried by said float, pointers mounted in said outer bowl and a horizontal azimuth circle carried by said column, substantially as and for the purposes described.

9. In an apparatus of the character described, the combination with an outer bowl suspended from gimbals and partly filled with a heavy liquid, of an inner bowl floating in said liquid with ribs projecting into said liquid and being itself partly filled with a heavy liquid, a float floating in the liquid in said inner bowl and provided with ribs projecting into said liquid, a vertical column carried by said float, pivoted pointers mounted on said outer bowl one hundred and eighty degrees apart, springs for holding said pointers in any desired position, and a horizontal azimuth circle carried by said column between said pointers, substantially as and for the purposes described.

10. In an apparatus of the character described, the combination with an outer bowl suspended from gimbals and partly filled with a heavy liquid, of an inner bowl floating in said liquid with ribs projecting into said liquid and being itself partly filled with a heavy liquid, a float floating in the liquid in said inner bowl and provided with ribs projecting into said liquid, and a ball and socket joint connecting said float and said inner bowl, a vertical column carried by said float, and apparatus for taking observations carried by said column, substantially as and for the purposes described.

11. In an apparatus of the character described, the combination with an outer bowl suspended from gimbals and partly filled with a heavy liquid, of an inner bowl floating in said liquid with ribs projecting into said liquid and being itself partly filled with a heavy liquid, a float floating in the liquid in said inner bowl and provided with ribs projecting into said liquid, a ball and socket joint connecting said float and said inner bowl, a vertical column carried by said float, pointers mounted in said outer bowl and a horizontal azimuth circle carried by said column, substantially as and for the purposes described.

12. In an apparatus of the character described, the combination with an outer bowl suspended from gimbals and partly filled with a heavy liquid, of an inner bowl floating in said liquid with ribs projecting into said liquid and being itself partly filled with a heavy liquid a float floating in the liquid in said inner bowl, and provided with ribs projecting into said liquid, a ball and socket joint connecting said float and said inner bowl, a vertical column carried by said float, pivoted pointers mounted on said outer bowl one hundred and eighty degrees apart, springs for holding said pointers in any desired position, and a horizontal azimuth circle carried by said column between said pointers, substantially as and for the purposes described.

13. The combination with a vessel containing liquid, of a movable float therein, a graduated circle attached to and carried by said float parallel to the surface of said liquid, and pointers secured in a fixed direction for indicating the bearing of any given diameter of said circle, substantially as and for the purposes described.

14. The combination with a vessel containing liquid, of a movable float therein, a graduated circle attached to and carried by said float parallel to the surface of said liquid, pointers set on some fixed object on either side of said circle, and one hundred and eighty degrees apart for indicating the bearing of any given diameter of said circle, substantially as and for the purposes described.

15. In an apparatus of the character described, the combination with a vessel containing liquid, and means for keeping the surface of said liquid level irrespective of the motion of the ship, of a float immersed in said liquid a column supported vertically by said float, the bracket R revolubly mounted on said column, the telescope carrier bracket $R^2$ pivotally connected to said bracket R and provided with counterpoise arms $R^3$ and weights $R^4$, the telescope, mirror, and object glass fixed on said telescope carrier bracket, and a plurality of circles concentric with each other for indicating the latitude, declination, and hour-angle, substantially as and for the purposes described.

16. In an apparatus of the character described, the combination with a vertical column and means for keeping the axis of the same in a vertical position, of the bracket R revolubly mounted on said column, the telescope carrier bracket $R^2$ pivotally connected to said bracket R and provided with counterpoise arms $R^3$ and weights $R^4$, the telescope, mirror, and object glass fixed on said telescope carrier bracket, and a plurality of circles concentric with each other for indicating the latitude, declination, and hour-angle, substantially as and for the purposes described.

17. In an apparatus of the character described, the combination with a vertical column and means for keeping the axis of the same in a vertical position, of an azimuth circle secured at right-angles to the axis of said column and means for indicating the bearing of a given diameter of said azimuth circle; the bracket R revolubly mounted on said column, the telescope carrier bracket $R^2$ pivotally connected to said bracket R and provided with counterpoise arms $R^3$ and weights $R^4$, the telescope, mirror, and object glass fixed on said telescope carrier bracket, and a plurality of circles concentric with each other for indicating the latitude, declination, and hour-angles, substantially as and for the purposes described.

18. In an apparatus of the character described, the combination with a vertical column and means for keeping the axis of the same in a vertical position, of an azimuth circle secured at right-angles to the axis of said column and means for indicating the bearing of a given diameter of said azimuth circle; a telescope carrier bracket pivotally mounted on said column with counterpoises for balancing the same, the telescope, mirror, and object glass fixed on said telescope carrier bracket; a declination circle and a movable connection between said telescope carrier bracket and said declination circle, and an equatorial circle, meridian circle and polar bracket concentric with said declination circle and mounted on said column, substantially as and for the purposes described.

19. In an apparatus of the character described, the combination with a vertical column and means for keeping the axis of the same in a vertical position, of a telescope carrier bracket pivotally mounted on said column with counterpoises for balancing the same, the telescope, mirror, and object glass fixed on said telescope carrier bracket; a declination circle and a movable connection between said telescope carrier bracket and said declination circle, and an equatorial circle, meridian circle and polar bracket concentric with said declination circle and mounted on said column, substantially as and for the purposes described.

20. In an apparatus of the character described, the combination with a vertical column and means for keeping the axis of the same in a vertical position, of a telescope carrier bracket pivotally mounted on said column with counterpoises for balancing the same, the telescope, mirror, and object glass fixed on said telescope carrier bracket; a declination circle and a movable connection between said telescope bracket and said declination circle, an equatorial circle, a meridian circle fixed at right-angles thereto and revolving about the same diameter with said declination circle, a polar bracket, all of said circles and said polar bracket being concentric with said declination circle and mounted on said column, substantially as and for the purposes described.

21. In an apparatus of the character described, the combination with a vertical column and means for keeping the axis of the same in a vertical position, of a telescope carrier bracket pivotally mounted on said column with counterpoises for balancing the same, the telescope, mirror, and object glass fixed on said telescope carrier bracket; a declination circle and a movable connection between said telescope bracket and said declination circle, an equatorial circle, a meridian circle fixed at right-angles to said equatorial circle, said equatorial circle being journaled at points ninety degrees from said meridian circle, a bracket supporting said journals and a polar bracket, all of said circles and said polar bracket being concentric with said declination circle and mounted on said column, substantially as and for the purposes described.

22. In an apparatus of the character described, the combination with a vessel containing liquid, and means for keeping the surface of said liquid level irrespective of the motion of the ship, of a float immersed in said liquid, a vertical column supported by said float, the bracket R revolubly mounted on said column, the telescope carrier bracket $R^2$ pivotally connected to said bracket R and provided with counterpoise arms $R^3$ and weights $R^4$, the telescope, mirror, and object glass fixed on said telescope carrier bracket, a stellar sphere and a plurality of circles concentric with each other and with said sphere, for indicating the latitude, declination, and hour angle, substantially as and for the purposes described.

23. In an apparatus of the character described, the combination with a vertical column and means for keeping the axis of the same in a vertical position, of the bracket R revolubly mounted on said column, the telescope carrier bracket $R^2$ pivotally connected to said bracket R and provided with counterpoise arms $R^3$ and weights $R^4$, the telescope, mirror, and object glass fixed on said telescope carrier bracket, a stellar sphere and a plurality of circles concentric with each other and with said sphere for indicating the latitude, declination, and hour angle, substantially as described.

24. In an apparatus of the character described, the combination with a vertical column and means for keeping the axis of the same in a vertical position, of an azimuth circle secured at right-angles to the axis of said column and means for indicating the bearing of a given diameter of said azimuth circle; the bracket R revolubly mounted on said column, the telescope carrier bracket $R^2$ pivotally connected to said bracket R and provided with counterpoise arms $R^3$ and weights $R^4$, the telescope, mirror, and object glass fixed on said telescope carrier bracket, a stellar sphere, and a plurality of circles concentric with each other and with said sphere for indicating the latitude, declination, and hour angle, substantially as and for the purposes described.

25. In an apparatus of the character described, the combination with a vertical column and means for keeping the axis of the same in a vertical position, of a telescope carrier bracket pivotally mounted on said column, the telescope, mirror, and object glass fixed on said telescope carrier bracket; a declination circle and a movable connection between said telescope bracket and said declination circle, an equatorial circle, a meridian circle fixed at right-angles to said equatorial circle, said equatorial circle being journaled at points ninety degrees from said meridian circle, a bracket supporting said journals, and a polar bracket, all of said circles and said polar brackets being concentric with said declination circle and mounted on said column, substantially as and for the purposes described.

26. In an apparatus of the character described, the combination with a vertical column and means for keeping the axis of the same in a vertical position, of a telescope carrier bracket pivotally mounted on said column, the telescope, mirror, and object glass fixed on said telescope carrier bracket; a declination circle and a movable connection between said telescope bracket and said declination circle, an equatorial circle, a meridian circle fixed at right-angles to said equatorial circle said equatorial circle being journaled at points ninety degrees from said meridian circle, a bracket supporting said journals, and a polar bracket, all of said circles and said polar brackets being concentric with said declination circle and mounted on said column and a vernier arm fast to said equatorial circle, and traveling along said polar bracket, substantially as and for the purposes described.

In testimony whereof I affix my signature in presence of two witnesses.

WILLIAM H. BEEHLER.

Witnesses:
MAURICE J. SIOUSSA,
PERCY C. BOWEN.